(12) United States Patent
Kovishaner

(10) Patent No.: US 9,864,546 B1
(45) Date of Patent: Jan. 9, 2018

(54) FIFO-BASED OPERATIONS FOR REDUNDANT ARRAY OF INDEPENDENT DISKS (RAID) DEVICE

(71) Applicant: Marvell Israel (M.I.S.L) Ltd., Yokneam (IL)

(72) Inventor: Gregory Kovishaner, Ramat-Gan (IL)

(73) Assignee: MARVELL ISRAEL (M.I.S.L) LTD., Yokneam (IL)

( * ) Notice: Subject to any disclaimer, the term of this patent is extended or adjusted under 35 U.S.C. 154(b) by 55 days.

(21) Appl. No.: 15/059,758

(22) Filed: Mar. 3, 2016

Related U.S. Application Data

(60) Provisional application No. 62/129,598, filed on Mar. 6, 2015, provisional application No. 62/101,111, filed on Jan. 8, 2015.

(51) Int. Cl.
*G06F 12/00* (2006.01)
*G06F 3/06* (2006.01)

(52) U.S. Cl.
CPC .......... *G06F 3/0656* (2013.01); *G06F 3/0604* (2013.01); *G06F 3/0619* (2013.01); *G06F 3/0689* (2013.01)

(58) Field of Classification Search
CPC .... G06F 3/0656; G06F 3/0604; G06F 3/0619; G06F 3/0689
See application file for complete search history.

(56) References Cited

U.S. PATENT DOCUMENTS

| 6,151,641 A * | 11/2000 | Herbert | G06F 3/0607 710/22 |
| 7,161,849 B1 * | 1/2007 | Lowe | G06F 5/14 365/189.05 |
| 2002/0133783 A1 * | 9/2002 | Oldfield | G06F 11/1076 714/800 |

* cited by examiner

*Primary Examiner* — Kalpit Parikh

(57) ABSTRACT

Apparatuses and methods for modifying data stored on a disk are provided. A buffer comprises a FIFO queue. The FIFO queue includes a plurality of buffer lines for queuing data units in a predetermined order. A controller is configured to write data units from the disk to respective buffer lines of the FIFO queue. The controller is further configured to perform read-modify-write (RMW) operations to modify the data units written to the queue. Each RMW operation includes (i) popping a data unit from a buffer line of the queue based on a location of a read pointer, (ii) performing a mathematical or logic operation to modify the data unit that is popped from the queue, and (iii) pushing the modified data unit into the queue. The modified data unit is written to a buffer line of the queue based on a location of a write pointer.

18 Claims, 11 Drawing Sheets

FIFO-BASED OPERATIONS FOR REDUNDANT ARRAY OF INDEPENDENT DISKS (RAID) DEVICE

CROSS-REFERENCE TO RELATED APPLICATIONS

This application claims priority to U.S. Provisional Patent Application No. 62/129,598, filed Mar. 6, 2015, entitled "FIFO-Based Read-Modify-Write Pipe Operations for RAID H/W Accelerator," which is incorporated herein by reference in its entirety.

FIELD

The technology described herein relates generally to data storage and more particularly to systems and methods for generating parity data for a Redundant Array of Independent Disks (RAID) device.

BACKGROUND

In RAID systems, data is distributed over multiple disk drives to provide fault tolerance against drive failures, among other benefits. The RAID standard specifies a number of fault tolerance methods for the storage of data on a RAID device, with the methods being represented by different RAID levels. Commonly used RAID levels include RAID levels 0-6, among others. RAID levels 1 through 5 provide a single drive fault tolerance. Thus, these RAID levels allow reconstruction of original data if any one of the disk drives fails. RAID level 6 can overcome the failure of any two disk drives. To provide fault tolerance, computing systems employing RAID calculate parity data. When data of a disk drive fails, data segments on the failed disk drive can be reproduced using the parity data.

The description above is presented as a general overview of related art in this field and should not be construed as an admission that any of the information it contains constitutes prior art against the present patent application.

SUMMARY

Examples of an apparatus and a method for modifying data stored on a disk are provided. An example apparatus for modifying data stored on a disk includes a buffer comprising a First-In-First-Out (FIFO) queue. The FIFO queue includes a plurality of buffer lines for queuing data units in a predetermined order. The apparatus further includes a controller configured to write data units from the disk to respective buffer lines of the FIFO queue. The controller is further configured to perform read-modify-write (RMW) operations to modify the data units written to the queue. Each RMW operation includes (i) popping a data unit from a buffer line of the queue based on a location of a read pointer, (ii) performing a mathematical or logic operation to modify the data unit that is popped from the queue, and (iii) pushing the modified data unit into the queue. The modified data unit is written to a buffer line of the queue based on a location of a write pointer. The buffer comprises a structure that enables each of the RMW operations to be completed within a single clock cycle.

An example apparatus for generating parity data for a Redundant Array of Independent Disks (RAID) device, the RAID device storing data across a plurality of disks, includes a buffer comprising a FIFO queue. The FIFO queue includes a plurality of buffer lines for queuing data units during the generation of the parity data. A controller is configured to write data units from a disk of the plurality of disks to lines of the FIFO queue. Each data unit is written to a respective buffer line based on a location of a write pointer. The controller is also configured to perform multiple read-modify-write (RMW) operations to generate the parity data, each RMW operation including (i) popping a data unit from a buffer line of the queue based on a location of a read pointer, (ii) performing a mathematical or logic operation to modify the data unit that is popped from the queue, and (iii) pushing the modified data unit into the queue. The modified data unit is pushed to a buffer line of the queue based on a location of the write pointer. The buffer comprises a structure that enables each of the RMW operations to be completed within a single clock cycle.

In an example method for generating parity data for a RAID device, the RAID device storing data across a plurality of disks, data units are written from a disk of the plurality of disks to buffer lines of a FIFO queue formed in a buffer. The FIFO queue comprises a plurality of buffer lines for queuing data units during the generation of the parity data. Multiple read-modify-write (RMW) operations are performed to generate the parity data. Each RMW operation includes popping a data unit from a buffer line of the queue based on a location of a read pointer and performing a mathematical or logic operation to modify the data unit that is popped from the queue. Each RMW operation further includes pushing the modified data unit into the queue. The modified data unit is pushed to a buffer line of the queue based on a location of a write pointer.

BRIEF DESCRIPTION OF THE DRAWINGS

FIGS. 1B-1D depict example data segments, according to embodiments.

DETAILED DESCRIPTION

Figure 1A:
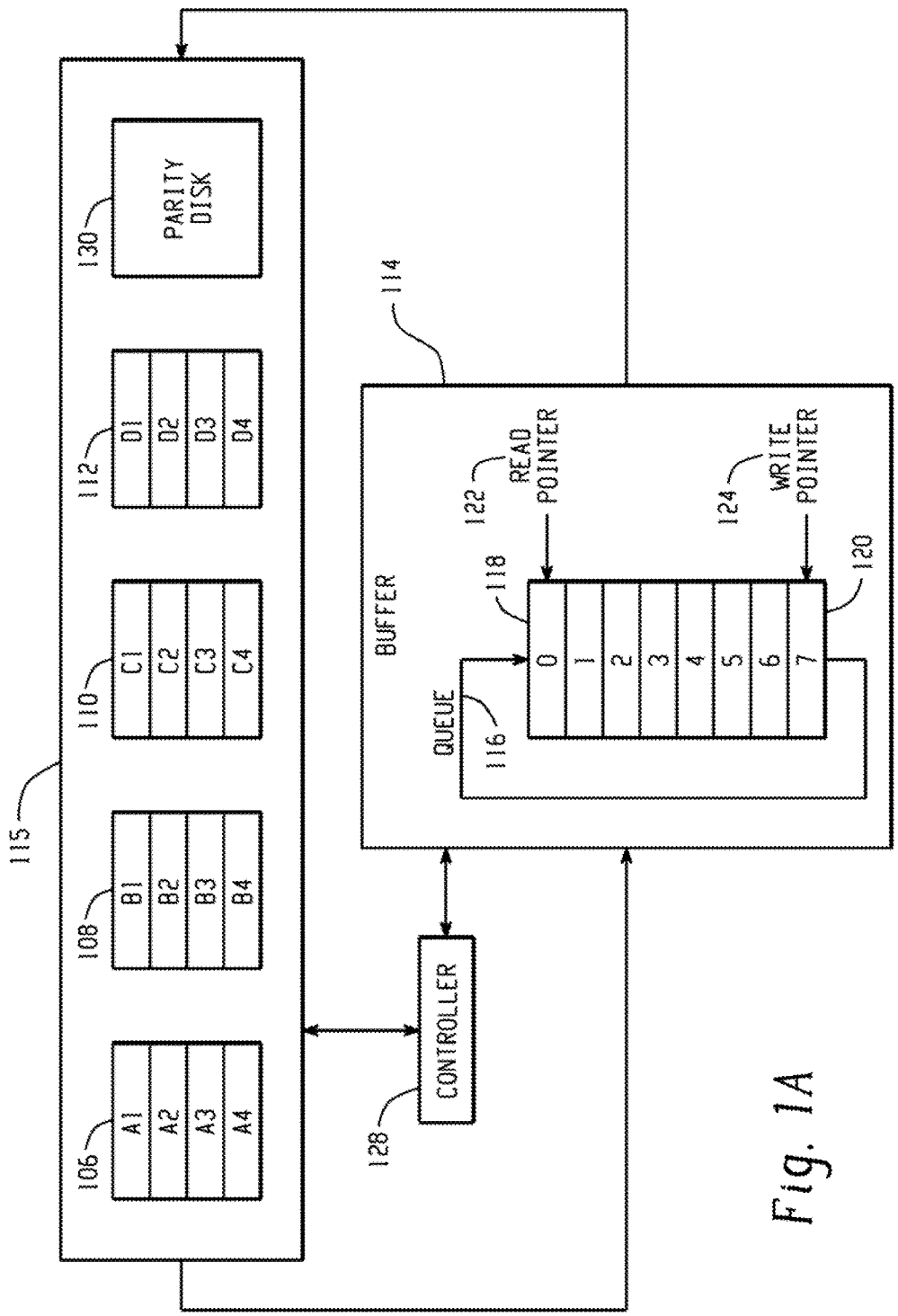
FIG. 1A depicts a set of disks of a RAID device and a buffer used in generating parity data for the RAID device, according to an embodiment.

FIG. 1A depicts a set of disks 115 of a Redundant Array of Independent Disks (RAID) device and a buffer 114 used in generating parity data for the RAID device, according to an embodiment. In the example of FIG. 1A, the set of disks 115 comprises a RAID volume having four data disks 106, 108, 110, 112 and a parity disk 130. It is noted that the set of disks 115 comprising the RAID volume of FIG. 1A is merely an example and that other configurations of disks are used in other examples. In another example, for instance, a "9+2" disk configuration is used, with the RAID volume comprising nine data disks and two parity disks. For ease of understanding, the example of FIG. 1A includes only the four data disks 106, 108, 110, 112 and single parity disk 130, but it is noted that the approaches described herein are applicable to other RAID configurations, such as the aforementioned 9+2 disk configuration.

Large data sets (e.g., large files, such as audio/video files, etc.) are stored across the multiple data disks 106, 108, 110, 112 in "stripes." In one example, for instance, a first segment A1 of a data set is stored on the first disk 106, a second segment B1 of the data set is stored on the second disk 108, a third segment C1 of the data set is stored on the third disk 110, and a fourth segment D1 of the data set is stored on the fourth disk 112. This is depicted in FIG. 1A. Each of these data segments A1, B1, C1 and D1 comprises multiple data units, with each data unit having a same, fixed size. To illustrate this, reference is made to FIGS. 1B and 1C. FIG. 1B illustrates the data segment A1 stored on the first disk 106, and FIG. 1C illustrates the data segment B1 stored on the second disk 108. In the example of FIGS. 1A-IC, the data segment A1 comprises eight data units 150-157, and the data segment B1 comprises eight data units 160-167. Each of the data units 150-157 and 160-167, which may also be known as "data words," has a same, fixed size (e.g., 512 KB, etc.).

In examples, the data segments stored on the disks 106, 108, 110, 112 have sizes that vary. In one example, for instance, each of the data segments A1-A3, B1-B3, C1-C3, and D1-D3 comprises eight data units (e.g., as is illustrated in FIGS. 1B and 1C for the data segments A1 and B1, respectively), and each of the data segments A4, B4, C4, and D4 comprises five data units. To illustrate a data segment comprising five data units, FIG. 1D shows the data segment A4 comprising five data units 170-174. Thus, in this example, each of the data segments A1-A3, B1-B3, C1-C3, and D1-D3 has a size of 4096 KB (i.e., 8 data units, with each data unit having the fixed size of 512 KB), and each of the data segments A4, B4, C4, and D4 has a size of 2560 KB (i.e., 5 data units, with each data unit having the fixed size of 512 KB).

Referring again to FIG. 1A, parity data is calculated for the data stored on the data disks 106, 108, 110, 112. Such parity data is stored on the parity disk 130 in the example of FIG. 1A. For example, a first parity data segment P1 is written to the parity disk 130, with the first parity data segment P1 comprising parity information for the data segments A1, B1, C1, and D1. Likewise, a second parity data segment P2 is written to the parity disk 130, with the second parity data segment P2 comprising parity information for the data segments A2, B2, C2, and D2, and so on. When a disk of the disk set 115 fails, data segments stored on the failed disk can be reproduced using the parity data stored on the parity disk 130. In the example of FIG. 1A, for instance, a data set comprising the data segments A1, B1, C1, and D1 is stored across the disks 106, 108, 110, 112, and parity data P1 for these data segments is stored on the parity disk 130. If the first disk 106 fails, data of the data segment A1 can be reproduced based on (i) the data segments B1, C1, and D1 stored on the disks 108, 110, 112 that did not fail, and (ii) the parity data P1 stored on the parity disk 130.

RAID levels 1 through 5 can overcome the failure of a single data disk, and RAID level 6 can overcome the failure of two data disks. To overcome the failure of the two data disks, computer systems employing RAID 6 calculate two types of parity data for each set of data segments. The two types of parity data, known to those of ordinary skill in the art, are "P parity data" and "Q parity data." In some systems, P parity data is calculated as an exclusive OR (XOR) of data segments spanning a horizontal row across multiple data disks. In the example of FIG. 1A, parity data P1 may be calculated as an XOR of data segments A1, B1, C1, and D1, for instance. In some systems, Q parity data is calculated as an XOR spanning a diagonal of data segments across multiple data disks. For example, in the example of FIG. 1A, parity data Q1 may be calculated as an XOR of data segments A4, B3, C2, and D1, for instance. The approaches of the instant disclosure are applicable in both single-channel RAID hardware accelerators, in which a single type of parity data (e.g., either of P parity data or Q parity data) is calculated during a given period of time, and dual-channel RAID hardware accelerators, in which two types of parity data (e.g., both P parity data and Q parity data) are calculated during a given period of time (e.g., in parallel). Further, although the approaches of the instant disclosure are described in the context of a RAID device, the approaches described herein are not limited to this context. This is described in further detail below.

To generate the parity data (e.g., P parity data, Q parity data, etc.) that is stored on the parity disk 130, the approaches of the instant disclosure utilize a buffer 114 that is coupled to the set of disks 115. As described above, the data disks 106, 108, 110, 112 store data in data units (e.g., data words) having a fixed, particular size (e.g., a word size), and the buffer 114 is configured to store such data units in lines of the buffer 114. The lines of the buffer 114 are referred to as "buffer lines" herein. In examples, the buffer 114 has a fixed width that is equal to the size of a single data unit stored on the disks 106, 108, 110, 112. For instance, in the example described above with each data unit having a fixed size of 512 KB, the buffer 114 likewise has a fixed width equal to 512 KB. Each buffer line of the buffer 114 is configured to store only a single, fixed-size data unit (e.g., data word) from the data disks 106, 108, 110, 112, and a buffer line is filled completely by a single data unit. It is thus noted that the data units of the disks 106, 108, 110, 112 have a uniform length that is equal to the fixed width of the buffer 114, in embodiments.

In the approaches of the instant disclosure, a queue 116 is formed in the buffer 114, with the queue 116 comprising multiple buffer lines of the buffer 114. Although the example of FIG. 1A depicts the buffer 114 including the single queue 116 formed therein, in other examples, the buffer 114 includes multiple queues. In examples, one queue is used in calculating P parity data, and another queue is used in calculating Q parity data. The queue 116 is configured to queue data units in a predetermined order during the generation of the parity data. In an example, the queue 116 comprises a First-In-First-Out (FIFO) queue (e.g., a FIFO queue data structure, where items are taken out of the queue data structure in the same order they were put in, etc.) with a head 118 of the queue 116 comprising a first buffer line of the buffer 114 and a tail 120 of the queue 116 comprising a second buffer line of the buffer 114. The FIFO queue 116 includes a write pointer 124 (e.g., an input pointer) and a read pointer 122 (e.g., an output pointer) that are incremented each time a data unit is written to the queue 116 or read from the queue 116, respectively, in a FIFO manner. In embodiments, the FIFO queue 116 comprises a circular queue (i.e., a cyclic queue), such that upon reaching the end of the queue 116, the pointers 122, 124 wrap around to the beginning of the queue 116. In examples, the tail 120 of the queue 116 is connected back to the head 118 of the queue 116 via a linking indication (e.g., a pointer), such that the read and write pointers 122, 124 to the queue 116 wrap around in the aforementioned manner. In examples, the queue 116 is a logical queue comprising one or more portions of the buffer 114 that implement a queue data structure. Although embodiments described herein utilize queue data structures, it is noted that the buffer 114 stores data units in other suitable data structures in other embodiments (e.g., linked list data structures, etc.). In some embodiments, the queues are hardware queues, but it is noted that the queues described herein are not limited to such hardware queues and comprise logical queues in embodiments, as described above.

In embodiments, the FIFO queue 116 has a fixed width that is equal to the fixed width of the buffer 114, such that each buffer line of the queue 116 is configured to store only a single, fixed-size data unit (e.g., data word) from the data disks 106, 108, 110, 112. Thus, each buffer line of the queue 116 is filled completely by a single data unit, as the data units of the disks 106, 108, 110, 112 have a uniform length that is equal to the fixed width of the queue 116, in embodiments. Further, in the example of FIG. 1A, the FIFO queue 116 has a fixed maximum size of eight buffer lines, and additional lines of the buffer 114 cannot be allocated to the queue 116. The size of the queue 116 of FIG. 1A (e.g., 8 buffer lines) is only an example, and in other examples, the queue 116 comprises a different number of buffer lines of the buffer 114. In the FIFO queue 116, the buffer lines 118 and 120 comprising the respective head and tail of the queue 116 are located at multiple, non-contiguous lines of the buffer 114, in an embodiment.

The buffer 114 is managed by a controller 128 that is coupled to both the disks 115 and the buffer 114. Although the example of FIG. 1A depicts the buffer 114 and controller 128 as being separate components, in other examples, the buffer 114 and controller 128 are integrated together to form a combined buffer/controller unit. In examples, the controller 128 is implemented in hardware, software, or some combination thereof. For instance, the controller 128 is implemented using one or more computer processors, computer logic, state machine(s), ASIC, FPGA, DSP, etc., in examples. A hardware-based implementation of the controller 128 is described in further detail in U.S. Provisional Patent Application No. 62/101,111, which is incorporated herein by reference in its entirety. Such a hardware-based implementation includes, in embodiments, one or more hardware-based counters (e.g., counters for storing read addresses and write addresses, etc.), a memory (e.g., a dual-port memory) having a first latency, and multiple registers having a second latency that is less than the first latency. To generate the parity data using the buffer 114, the controller 128 is configured to write data units from one or more of the disks 106, 108, 110, 112 to buffer lines of the FIFO queue 116. Specifically, in performing this writing, each data unit is written to a respective buffer line of the queue 116 based on a location of the write pointer 124. After writing a data unit to a respective buffer line, the controller 128 advances the write pointer 124 to a next buffer line of the queue 116.

Figure 2:
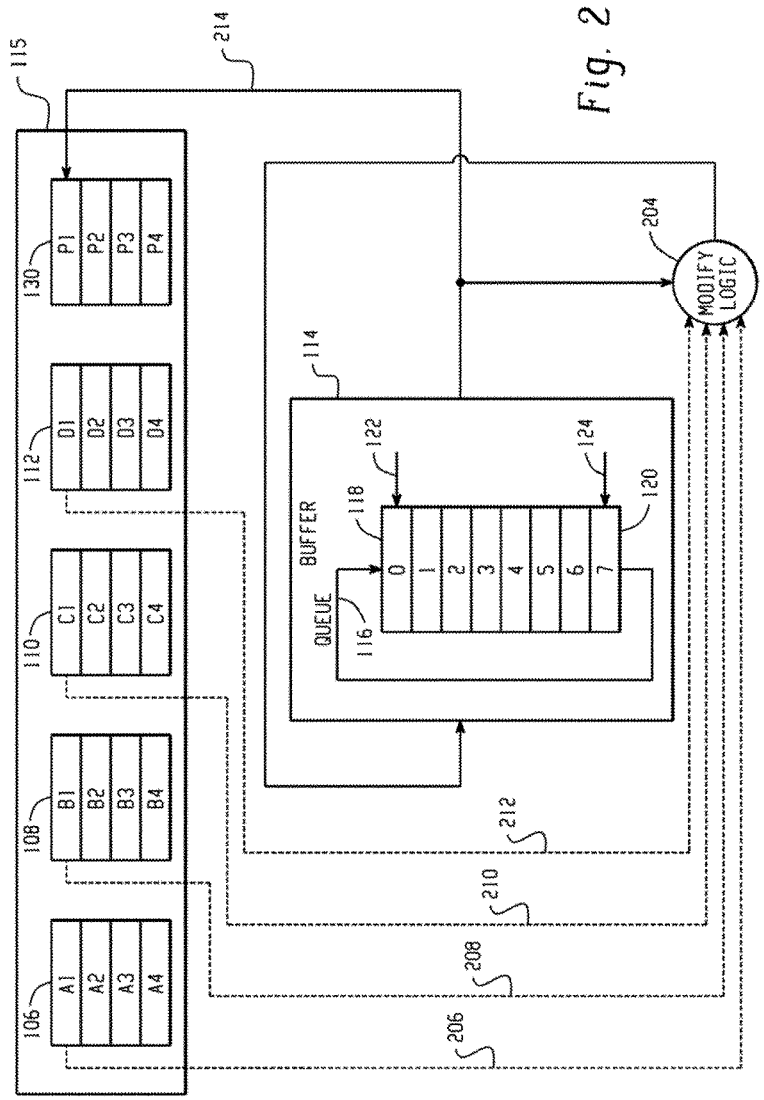
FIG. 2 depicts additional details of the system of FIG. 1A, according to an embodiment.

To illustrate an example writing of data units from one or more of the disks 106, 108, 110, 112 to buffer lines of the FIFO queue 116, reference is made to FIG. 2. In this example, data units of the data segment A1 stored on the disk 106 are written into respective buffer lines of the queue 116. In an example, the data segment A1 comprises the eight data units 150-157 (e.g., eight data words) shown in FIG. 1B, and each of these data units 150-157 is written to its own, respective buffer line of the queue 116. Thus, the controller 128 writes a first data unit 150 of the data segment A1 into a buffer line of the queue 116, advances the write pointer 124 to a next buffer line of the queue 116, writes a second data unit 151 of the data segment A1 into the next buffer line, advances the write pointer 124 again, and so on for the remaining data units 152-157 of the data segment A1.

For ease of illustration, the controller 128 is not depicted in FIG. 2, but it is noted that the controller 128 is responsible for performing and/or initiating each of the write operations and advancing the write pointer 124 in the manner described above. In order to write this data into the queue 116, read operations 206 are used to read data units from the data segment A1 into modify logic 204. The modify logic 204 is used in performing read-modify-write (RMW) operations, and both the modify logic 204 and the RMW operations are described in further detail below. RMW operations are not performed in the writing of the data units of the data segment A1 into the respective buffer lines of the queue 116, and so the modify logic 204 merely receives the data units from the disk 106 and enables these data units to be written to the queue 116 under the control of the controller 128. In other words, when writing the data units of the data segment A1 into the queue 116, these data units pass through the modify logic 204 without being modified.

After the writing of data units to the queue 116, the controller 128 next performs and/or initiates multiple RMW operations to generate the parity data. As described in further detail below, the buffer 114 is relatively fast (e.g., has a relatively low latency) and comprises a structure that enables each of the RMW operations to be completed within a single clock cycle. Each RMW operation includes (i) reading a data unit from a buffer line of the queue 116 based on a location of the read pointer 122, (ii) advancing the read pointer 122 to a next buffer line of the queue 116 after the reading of the data unit, (iii) performing a mathematical or logic operation to modify the data unit that is read from the queue 116, (iv) writing the modified data unit to a buffer line of the queue 116 based on the location of the write pointer 124, and (v) advancing the write pointer 124 to a next buffer line of the queue 116 after the writing of the data unit. In examples, in the performing of the mathematical or logic operation, the controller 128 is configured to modify the data unit based on a value of a corresponding data unit stored on one of the disks 106, 108, 110, 112.

To illustrate an example RMW operation performed using the buffer 114 and FIFO queue 116 formed therein, reference is made again to FIG. 2. As described above, the operation 206 is performed to write data units 150-157 of the data segment A1 into respective buffer lines of the queue 116. In a single RMW operation, one of these data units written to the queue 116 is modified and then written back to the queue 116. In an example, the first data unit 150 (e.g., the first data word) of the data segment A1 is written to the head 118 of the queue 116, for instance. To modify the first data unit 150 stored in the queue 116, the data unit 150 is read from its respective buffer line 118 based on a location of the read pointer 122, and the read pointer 122 is subsequently advanced to the next buffer line of the queue 116 (e.g., the buffer line that follows the head 118, in this example). A mathematical or logic operation is performed to modify the data unit 150. In the example of FIG. 2, performing the mathematical or logic operation includes modifying the data unit 150 based on a value of the first data unit 160 of the data segment B1 stored on the disk 108. FIG. 2 illustrates a read operation 208 for reading the first data unit 160 of the data segment B1 from the disk 108.

The data unit 160 read from the disk 108 is received at modify logic 204, which also receives the data unit 150 read from the queue 116. To modify the data unit 150, the modify logic 204 performs a mathematical operation or logic operation involving the data units 150, 160. In an example, for instance, the modify logic 204 calculates an exclusive OR of the data units 150, 160 (i.e., data unit 150 XOR data unit 160) to generate a modified data unit. The controller 128 writes the modified data unit to a buffer line of the queue 116 based on a location of the write pointer 124, and the write pointer 124 is then advanced to a next buffer line of the queue 116. The writing of the modified data unit to the queue 116 and the advancing of the write pointer 124 completes the single RMW operation. The other data units 151-157 of the data segment A1 written to the queue 116 are modified in a similar manner. For example, the data unit 151 is read from the queue 116 based on the location of the read pointer 122, the read pointer 122 is advanced, the data unit 151 is modified in the modify logic 204 based on the corresponding data unit 161 stored on the disk 108, the modified data unit is written to the queue 116 based on the location of the write pointer 124, and the write pointer 124 is advanced.

In generating the parity data, additional RMW operations are then performed on the modified data units stored in the queue 116. After modifying the data units 150-157 of the data segment A1 stored in the queue 116 based on the data units 160-167 of the data segment B1 stored on the disk 108, the queue 116 is understood as storing data units "A1^B1," denoting the fact that the data units 150-157 of the data segment A1 were modified based on respective, corresponding data units 160-167 of the data segment B1. Subsequently, RMW operations are performed to modify the data units A1^B1 stored in the queue 116 based on respective, corresponding data units of the data segment C1 stored on the disk 110. Specifically, read operations 210 are used to read data units of the data segment C1 from the disk 110, with these data units being used in RMW operations to generate data units "A1^B1^C1" that are stored in the queue 116. Finally, in this example, RMW operations are performed to modify the data units A1^B1^C1 stored in the queue 116 based on respective, corresponding data units of the data segment D1 stored on the disk 112. Specifically, read operations 212 are used to read data units of the data segment D1 from the disk 112, with these data units being used in RMW operations to generate data units "A1^B1^C1^D1" that are stored in the queue 116.

In the example of FIGS. 1A-ID and 2, the data units A1^B1^C1^D1 stored on the queue 116 as a result of the above-described RMW operations comprise parity information for the data segments A1, B1, C1, and D1 stored on the respective disks 106, 108, 110, 112. It is thus noted that the parity information is stored as data units in buffer lines of the queue 116, with each data unit of the parity information being stored in a respective buffer line. As described above, the parity disk 130 is configured to store parity information for the data segments A1, B1, C1, and D1 in a parity data segment P1. To store the parity segment P1 to the parity disk 130, the controller 128 is configured to (i) read the parity data units A1^B1^C1^D1 from respective buffer lines of the queue 116 based on the location of the read pointer 122, with the read pointer 122 being advanced after the reading of each parity data unit, and (ii) write the parity data units to the parity disk 130 as the parity data segment P1. Write operations 214 for writing the parity data units to the parity disk 130 are depicted in FIG. 2.

In examples, the buffer 114 and the controller 128 are disposed on a same, first chip (e.g., a same die). The buffer 114 comprises a relatively fast memory with comparatively low latency, high bandwidth, and a relatively small storage capacity, in embodiments. The buffer 114 comprises static random-access memory (SRAM), in an embodiment, or another suitable internal memory configuration. In examples, the disks 106, 108, 110, 112 comprise relatively inexpensive memory with a comparatively slow speed, higher latency, and lower bandwidth, as compared to the buffer 114. The disks 106, 108, 110, 112 comprise dynamic random-access memory (DRAM), in an embodiment, or other suitable external memory configurations. A storage capacity of the disks 106, 108, 110, 112 typically is greater than that of the buffer 114.

The disks 106, 108, 110, 112 are disposed on a second chip that is separate from and coupled to the first chip on which the buffer 114 and controller 128 are disposed, in examples. The buffer 114 is referred to as "on-chip memory" or "internal memory," and the disks 106, 108, 110, 112 are referred to as "off-chip memory" or "external memory," in some embodiments. It is noted that in some embodiments, the disks 106, 108, 110, 112 and the buffer 114 are co-located on a same chip, package, or device. In other embodiments, the disks 106, 108, 110, 112 and the buffer 114 are disposed on two or more separate chips that are suitably coupled together in a package or device.

In conventional approaches to generating parity data for a RAID device, a FIFO-based buffer is not used. Specifically, the conventional approaches do not utilize the above-described FIFO queues formed in a buffer, where each of the FIFO queues utilizes read and write pointers that are incremented each time a data unit is written to the queue or read from the queue, respectively, in a FIFO manner. In the conventional approaches, the generation of the parity data is typically time consuming. Additionally, in the conventional approaches, multiple controllers are used, and coordinating operations among the multiple controllers is typically complex. In contrast to the conventional approaches, the approaches of the instant disclosure utilize the above-described FIFO-based buffer 114. The FIFO queues 116 formed in the buffer 114 are used in implementing the above-described FIFO operations, which are well-suited to the generation of the parity data. Specifically, the FIFO operations (e.g., implemented using the read and write pointers 122, 124 that traverse the FIFO queue 116) are well-suited for performing the multiple RMW operations used in generating the parity data, thus enabling these RMW operations to be carried out in a relatively fast manner. Further, the FIFO operations enable concurrent writing of data to the queue 116 and reading of parity data from the queue 116, which decreases an amount of time necessary to generate the parity data. These concurrent operations are explained in further detail below. Under the approaches of the instant application, a single controller is utilized, thus avoiding complex coordinating of operations among multiple controllers. Additionally, under the approaches of the instant disclosure, a relatively fast buffer is used. The buffer comprises a structure that enables an RMW operation to be completed within a single clock cycle, which is in contrast to conventional approaches that require multiple clock cycles. Other advantages of the instant disclosure are explained throughout this disclosure.

Although the approaches of the instant disclosure are described in the context of a RAID device, the approaches described herein are not limited to this context. Rather, the FIFO-based operations utilizing a buffer, as described herein, may be implemented in any system in which RMW operations are utilized to modify data stored on a disk. Thus, to modify data stored on a disk according to the systems and methods described herein, data units stored on the disk are written to respective buffer lines of a buffer, where the buffer includes a FIFO queue formed therein, and the FIFO queue comprises a plurality of buffer lines for queuing data units in a predetermined order. RMW operations are performed to modify the data units written to the queue, with each RMW operation including (i) reading a data unit from a buffer line of the queue based on a location of a read pointer, (ii) performing a mathematical or logic operation to modify the data unit that is read from the queue, and (iii) writing the modified data unit to a buffer line of the queue based on a location of a write pointer. In embodiments, the modified data units are subsequently read from the queue, with each data unit being read from a respective buffer line based on the location of the read pointer, and the modified data units are then written to the disk or another disk. The writing operations, RMW operations, and reading operations described above are performed and/or initiated by a controller (e.g., the controller 128), in embodiments.

The generation of a complete set of parity data for a set of disks of a RAID device utilizes multiple sub-cycles, in examples. With reference again to FIG. 1A, to generate a complete set of "P parity data" for the disks 106, 108, 110, 112, four sub-cycles are utilized: (i) a first sub-cycle during which a first parity data segment P1 comprising parity information for the data segments A1, B1, C1 and D1 is generated, (ii) a second sub-cycle during which a second parity data segment P2 comprising parity information for the data segments A2, B2, C2 and D2 is generated, (iii) a third sub-cycle during which a third parity data segment P3 comprising parity information for the data segments A3, B3, C3 and D3 is generated, and (iv) a fourth sub-cycle during which a fourth parity data segment P4 comprising parity information for the data segments A4, B4, C4 and D4 is generated. Likewise, to generate "Q parity data" for the disks 106, 108, 110, 112 of FIG. 1A, four sub-cycles would be utilized.

It is noted that a number of sub-cycles utilized to generate P parity data and Q parity data varies based on a number of data segments stored on a disk of the data disks. In the example of FIG. 1A, each of the disks 106, 108, 110, 112 includes four data segments (e.g., disk 106 stores data segments A1, A2, A3, and A4), and thus, four sub-cycles are utilized to generate a complete set of P parity data and four sub-cycles are utilized to generate a complete set of Q parity data. In embodiments, a number of sub-cycles utilized in generating a complete set of P parity data or Q parity data is equal to a number of data segments stored on a disk of the data disks. Thus, in an example in which each data disk stores L data segments, where L is an integer, L sub-cycles are utilized to generate a complete set of P parity data and L sub-cycles are utilized to generate a complete set of Q parity data. In other embodiments, a number of sub-cycles utilized in generating a complete set of P parity data or Q parity data is not equal to a number of data segments stored on a disk of the data disks.

Each of the aforementioned sub-cycles includes three stages, in embodiments: (i) a first stage in which data units from a disk of the data disks (e.g., the data disks 106, 108, 110, 112 in the example of FIG. 1) are written to buffer lines of a FIFO queue formed in a buffer (e.g., the FIFO queue 116 of the buffer 114 in the example of FIG. 1), with each data unit being written to a respective buffer line based on a location of a write pointer, (ii) a second stage in which multiple read-modify-write (RMW) operations are performed to generate parity data that is temporarily stored in buffer lines of the FIFO queue, with the parity data being stored as data units in respective buffer lines of the queue, and (iii) a third stage in which the parity data is read from the buffer, where each data unit of the parity data is read from a respective buffer line based on a location of a read pointer. Thus, a sub-cycle may be understood as including a writing stage, a read-modify-write stage, and a reading stage.

The approaches of the instant disclosure enable the reading stage of one sub-cycle to be performed concurrently with the writing stage of the next sub-cycle. The concurrent performance of the reading and writing stages decreases an amount of time needed to generate the parity data. To illustrate this, reference is made to FIG. 3. This figure depicts sub-cycles 304, 306, 308, 310 used in generating parity data, according to an embodiment. Specifically, the sub-cycles 304, 306, 308, 310 are used in generating a complete set of P parity data for the example RAID device of FIG. 1A. Thus, the first sub-cycle 304 is used in generating a first parity data segment P1 comprising parity information for the data segments A1, B1, C1 and D1, the second sub-cycle 306 is used in generating a second parity data segment P2 comprising parity information for the data segments A2, B2, C2 and D2, the third sub-cycle 308 is used in generating a third parity data segment P3 comprising parity information for the data segments A3, B3, C3 and D3, and the fourth sub-cycle 310 is used in generating a fourth parity data segment P4 comprising parity information for the data segments A4, B4, C4 and D4. Collectively, the four sub-cycles 304, 306, 308, 310 may be understood as comprising a single cycle 302.

Figure 3:
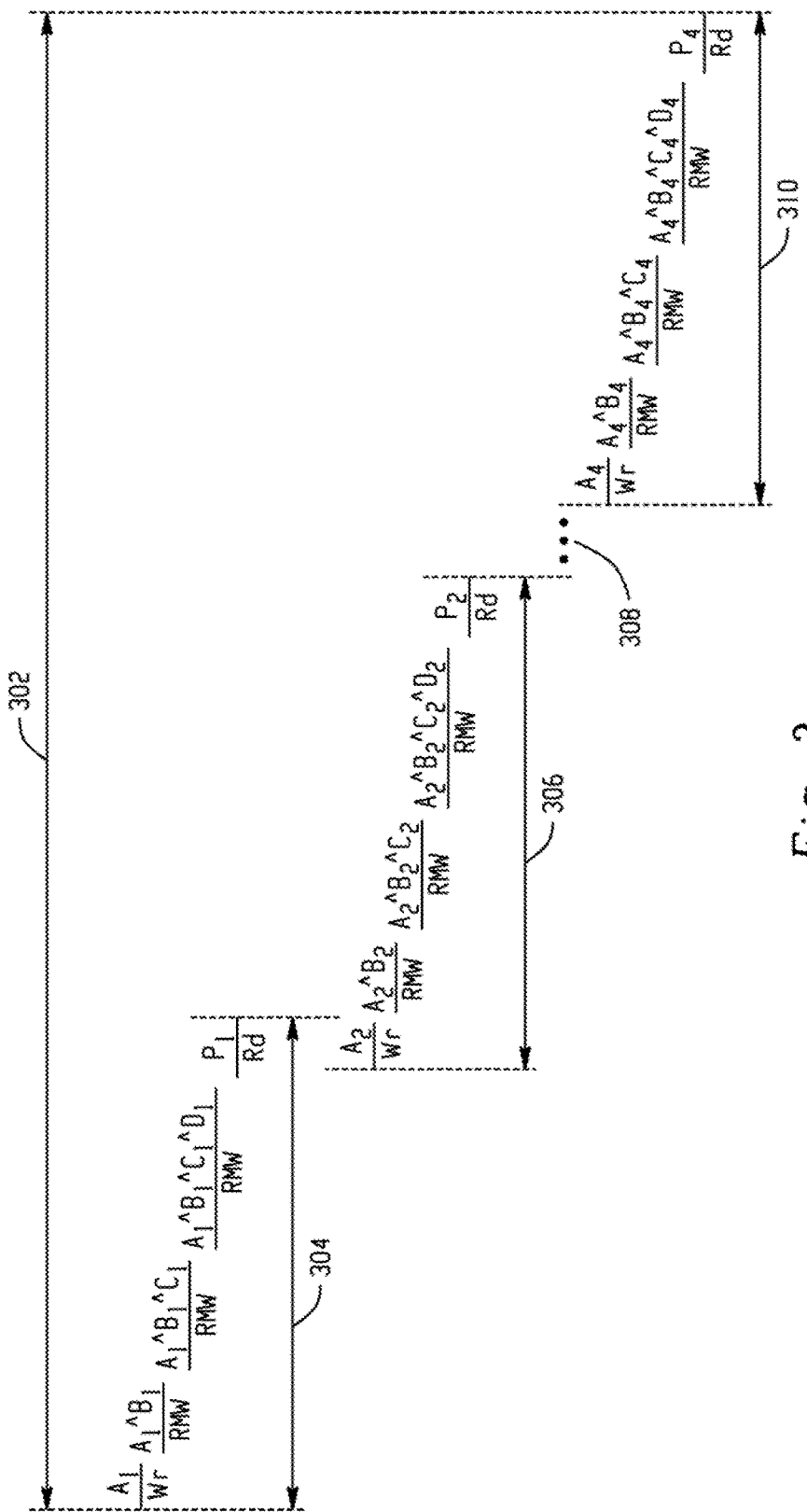
FIG. 3 depicts sub-cycles used in generating parity data, according to an embodiment.

As noted above, the approaches of the instant disclosure enable the reading stage of one sub-cycle to be performed concurrently with the writing stage of the next sub-cycle. For example, as shown in FIG. 3, a reading stage of the sub-cycle 304 is performed concurrently with the writing stage of the next sub-cycle 306. Likewise, a reading stage of the sub-cycle 306 is performed concurrently with the writing stage of the next sub-cycle 308, and so on. To illustrate how the approaches of the instant disclosure enable such concurrent operations, reference is made to FIGS. 4A-4D. These figures depict steps of an example method for generating parity data for a RAID device, according to an embodiment. Specifically, the steps shown in FIGS. 4A-4D are used in generating parity data for the example RAID device of FIG. 1A. In these figures, a buffer (e.g., the buffer 114 of FIG. 1A) is depicted. In accordance with the approaches of the instant disclosure, a FIFO queue is formed in the buffer, with the FIFO queue comprising multiple buffer lines of the buffer. The FIFO queue includes a write pointer (labeled "W-Pointer" in the example of FIGS. 4A-4D) and a read pointer (labeled "R-Pointer" in the example of FIGS. 4A-4D) that are incremented each time a data unit is written to the FIFO queue or read from the queue, respectively.

Figure 4A:
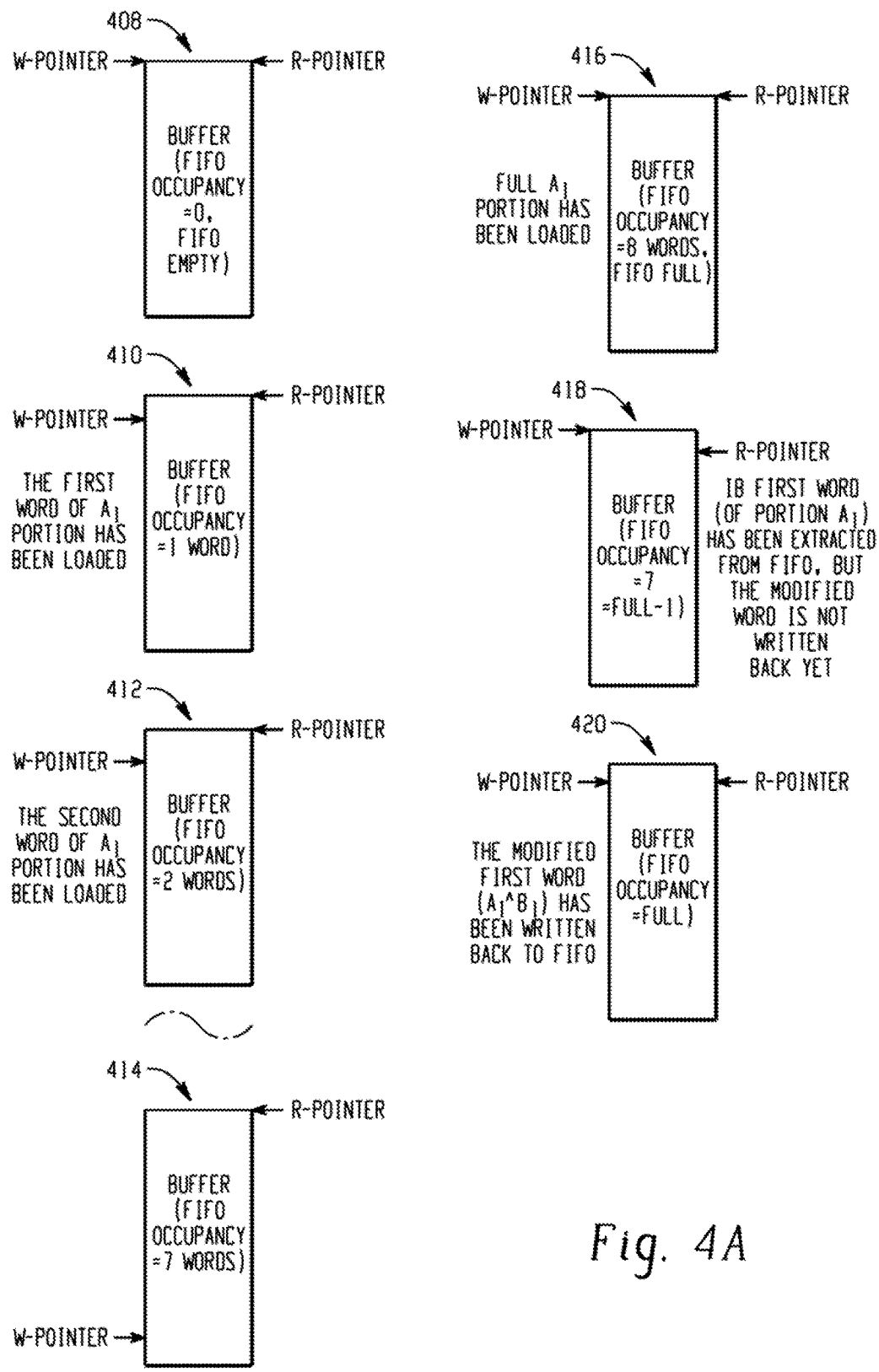
FIGS. 4A-4D depicts steps of an example method for generating parity data for a RAID device, according to an embodiment.

At step 408 shown in FIG. 4A, the FIFO queue is empty, and the read and write pointers point to a same buffer line of the queue. At step 410, a first data word of the data segment A1 is written to the FIFO queue, and the write pointer is subsequently advanced to a next buffer line of the queue. The example of FIGS. 4A-4D refers to "words" or "data words" being written to the FIFO queue and read from the FIFO queue. In embodiments, such words or data words are equivalent to the data units described above with reference to FIGS. 1A-3, such that, for instance, the data segment A1 may be understood as comprising data words 150-157 depicted in FIG. 1B. At step 412, a second data word of the data segment A1 is written to the FIFO queue, and the write pointer is subsequently advanced to a next buffer line of the queue.

The remainder of the data words of the data segment A1 (e.g., data words 152-157 depicted in FIG. 1B) are written to the FIFO queue, with the write pointer being advanced after each word is written to the queue. At steps 414 and 416, a last word of the data segment A1 is written to the FIFO queue, and the write pointer is advanced from the tail of the queue to the head of the queue. It is thus noted that in examples, the FIFO queue comprises a circular queue, thus enabling the read and write pointers to wrap around from the tail of the queue to the head of the queue in this manner. In the example of FIGS. 4A-4D, the FIFO queue has a fixed maximum size of M buffer lines, where M is an integer that is equal to a largest number of data words that make up a data segment stored on the data disks of the RAID device. In the example of FIG. 1A described above, some data segments (e.g., data segments A1-A3, B1-B3, C1-C3, and D1-D3) comprise eight data words, and other data segments (e.g., data segments A4, B4, C4, and D4) comprise five data words. In this example, the FIFO queue of FIGS. 4A-4D has a fixed maximum size of eight buffer lines, corresponding to the number of data words comprising each of the data segments A1-A3, B1-B3, C1-C3, and D1-D3.

After the step 416 has been performed, all data words of the data segment A1 have been written to the FIFO queue. The steps 408, 410, 412, 414, 416 make up the "writing stage" of the sub-cycle 304 depicted in FIG. 3. Multiple RMW operations are performed in the subsequent "read-modify-write stage" of the sub-cycle 304. To illustrate the multiple RMW operations, reference is made again to FIG. 4A. At step 418, a first word of the data segment A1 is read from a buffer line of the FIFO queue based on the location of the read pointer, and the read pointer is subsequently advanced to a next buffer line of the queue. In the example of FIGS. 4A-4D, the reading of the data word "pops" (e.g., removes) the data word from the queue, such that the queue has an occupancy of seven data words (i.e., full−1) after the step 418. Next, the data word that was read from the queue (i.e., the first word of the data segment A1) is modified based on a value of a first word of the data segment B1 stored on the disk 108. Modifying the data word includes performing a mathematical operation or logic operation involving the data words. In this example, the word read from the queue is the first data word 150 of the data segment A1, and the first word of the data segment B1 is the data word 160. Thus, the mathematical or logic operation may be, for example, (data word 150) XOR (data word 160). At 420, the modified data word (denoted as A1^B1 in FIG. 4A) is written to a buffer line of the FIFO queue based on the location of the write pointer, and the write pointer is subsequently advanced to a next buffer line of the queue. In the example of FIG. 4A, the modified data word is written to the buffer line of the queue from which the first word of the data segment A1 was read, and thus, the occupancy of the queue increases to eight data units (i.e., full). The steps 418 and 420 may be understood as comprising a single RMW operation. As noted above, multiple RMW operations are performed in the read-modify-write stage of the sub-cycle 304.

Figure 4B:
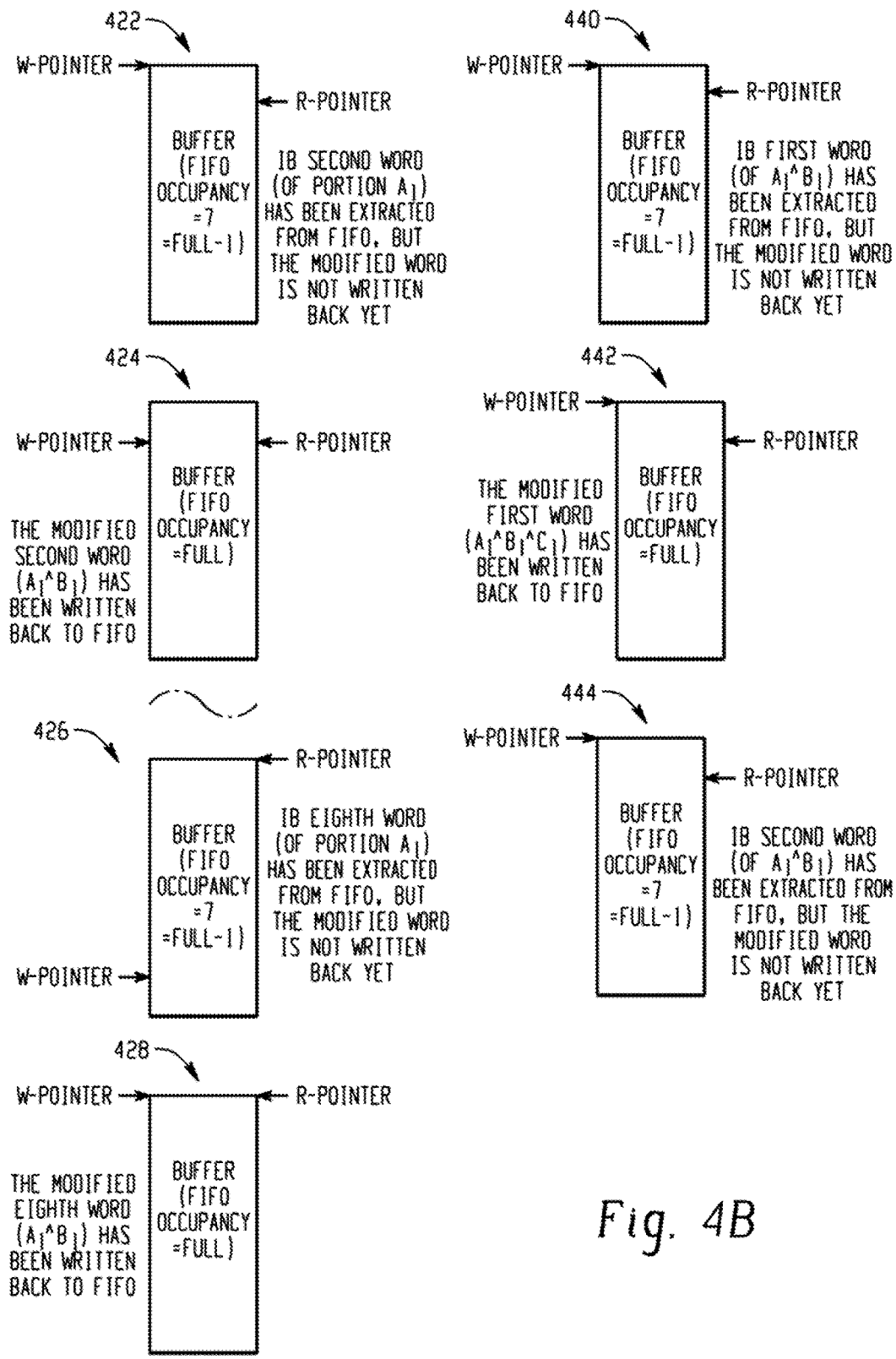
Figure 4C:
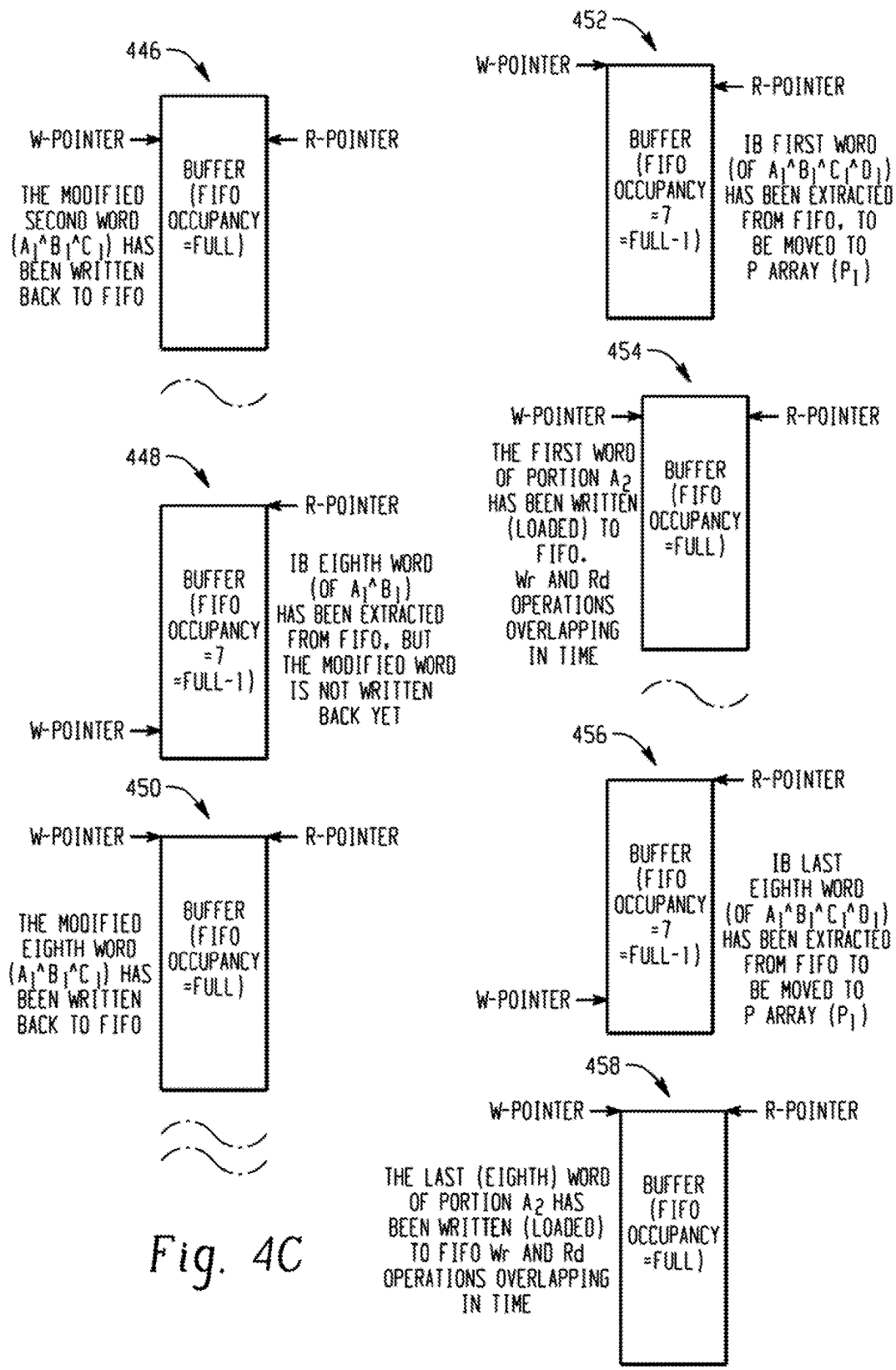

At step 422 shown in FIG. 4B, a second word of the data segment A1 is read from a buffer line of the FIFO queue based on the location of the read pointer, and the read pointer is subsequently advanced to a next buffer line of the queue. Next, the data word that was read from the queue (i.e., the second word of the data segment A1) is modified based on a value of a second word of the data segment B1 stored on the disk 108. At 424, the modified data word (denoted as A1^B1 in FIG. 4B) is written to a buffer line of the FIFO queue based on the location of the write pointer, and the write pointer is subsequently advanced to a next buffer line of the queue. Steps 422 and 424 comprise a second RMW operation of the read-modify-write stage of the sub-cycle 304. Steps 418-424 illustrate that an occupancy of the queue varies from "full−1" to "full" based on the read and write operations.

Additional RMW operations are performed in a like manner to modify the other data words of the data segment A1 stored in the FIFO queue. These RMW operations include steps 426 and 428 of FIG. 4B. At step 426, an eighth word of the data segment A1 is read from a buffer line of the FIFO queue based on the location of the read pointer, and the read pointer is subsequently advanced to a next buffer line of the queue. In the example of FIG. 4B, at the step 426, the read pointer is advanced from the tail of the FIFO queue to the head of the FIFO queue. Next, the data word that was read from the queue (i.e., the eighth word of the data segment A1) is modified based on an eighth word of the data segment B1 stored on the disk 108. At 428, the modified data word is written to a buffer line of the FIFO queue based on the location of the write pointer, and the write pointer is subsequently advanced to a next buffer line of the queue. In the example of FIG. 4B, at the step 428, the write pointer is advanced from the tail of the FIFO queue to the head of the FIFO queue.

Continuing the steps of the read-modify-write stage of the sub-cycle 304, at step 440, a first word of the modified data words A1^B1 is read from a buffer line of the FIFO queue based on the location of the read pointer, and the read pointer is subsequently advanced to a next buffer line of the queue. Next, the data word that was read from the queue (i.e., the first word of the modified data words A1^B1) is modified based on a first word of the data segment C1 stored on the disk 110. At 442, the modified data word (denoted as A1^B1^C1 in FIG. 4B) is written to a buffer line of the FIFO queue based on the location of the write pointer, and the write pointer is subsequently advanced to a next buffer line of the queue.

At step 444, a second word of the modified data words A1^B1 is read from a buffer line of the FIFO queue based on the location of the read pointer, and the read pointer is subsequently advanced to a next buffer line of the queue. Next, the data word that was read from the queue (i.e., the second word of the modified data words A1^B1) is modified based on a second word of the data segment C1 stored on the disk 110. At step 446 shown in FIG. 4C, the modified data word (denoted as A1^B1^C1 in FIG. 4C) is written to a buffer line of the FIFO queue based on the location of the write pointer, and the write pointer is subsequently advanced to a next buffer line of the queue. Additional RMW operations are performed in a like manner to modify the other data words of the modified data words A1^B1 stored in the FIFO queue. These RMW operations include the steps 448 and 450 of FIG. 4C. At step 448, an eighth word of the modified data words A1^B1 is read from a buffer line of the FIFO queue based on the location of the read pointer, and the read pointer is subsequently advanced to a next buffer line of the queue. Next, the data word that was read from the queue (i.e., the eighth word of the modified data words A1^B1) is modified based on an eighth word of the data segment C1 stored on the disk 110. At 450, the modified data word is written to a buffer line of the FIFO queue based on the location of the write pointer, and the write pointer is subsequently advanced to a next buffer line of the queue.

Similar RMW operations are performed to modify the data words A1^B1^C1 based on corresponding data words of the data segment D1 stored on the disk 112. Such RMW operations result in data words A1^B1^C1^D1 being written to buffer lines of the FIFO queue. In this example, the data words A1^B1^C1^D1 comprise parity information for the data segments A1, B1, C1, and D1 stored on the respective disks 106, 108, 110, 112. This parity information is denoted as "P1" in FIG. 3. When all of the data words A1^B1^C1^D1 have been generated and stored in the FIFO queue, the read-modify-write stage of the sub-cycle 304 is complete. It is thus noted that the steps 418-450 make up the read-modify-write stage of the sub-cycle 304 depicted in FIG. 3. After the read-modify-write stage is completed, the subsequent "reading stage" of the sub-cycle 304 begins. As noted above, the approaches of the instant disclosure enable the reading stage of one sub-cycle to be performed concurrently with the writing stage of the next sub-cycle. Thus, in the example of FIG. 3, the reading stage of the sub-cycle 304 is performed concurrently with the writing stage of the next sub-cycle 306.

To illustrate the performing of such reading and writing stages concurrently, reference is made again to FIG. 4C. At step 452, a first word of the parity data A1^B1^C1^D1 is read from a buffer line of the FIFO queue based on the location of the read pointer, and the read pointer is subsequently advanced to a next buffer line of the FIFO queue. The step 452 comprises a step of the reading stage of the sub-cycle 304. After this data word is read from the FIFO queue, it is written to a parity disk (e.g., parity disk 130 in the example of FIG. 1A) of the RAID device. At step 454, a first data word of the data segment A2 is written to the FIFO queue based on the location of the write pointer, and the write pointer is subsequently advanced to a next buffer line of the queue. The step 454 comprises a step of the writing stage of the sub-cycle 306.

Operations similar to the step 452 are performed to read the remainder of the data words of the parity data A1^B1^C1^D1 from the queue, thus enabling these data words to be written to the parity disk. These operations include the step 456 depicted in FIG. 4C. Likewise, operations similar to the step 454 are performed to write the remainder of the data words of the data segment A2 to the FIFO queue. These operations include the step 458 depicted in FIG. 4C. It is noted that in performing (i) the read operations for reading the parity data A1^B1^C1^D1 from the queue, and (ii) the write operations for writing the data words of the data segment A2 to the queue, such read and write operations are performed concurrently in time. In this manner, the reading stage of the sub-cycle 304 is performed concurrently with the writing stage of the next sub-cycle 306. The concurrent performance of the reading and writing stages decreases an amount of time needed to generate the parity data, as noted above.

The steps 408-456 make up the sub-cycle 304 illustrated in FIG. 3. The subsequent sub-cycles 306, 308 of the full processing cycle 302 are performed in a like manner. For brevity, steps of the sub-cycles 306, 308 are not explained in detail herein. During the reading stage of the sub-cycle 308, parity data A3^B3^C3^D3 is read from the FIFO queue. This parity data is denoted as "P3" in FIG. 3. The writing stage of the subsequent sub-cycle 310 is performed concurrently with the reading stage of the sub-cycle 308, in accordance with the approaches of the instant disclosure. During the writing stage of the sub-cycle 310, data words of the data segment A4 are written to the FIFO queue. At step 460 shown in FIG. 4D, a fifth data word of the parity data A3^B3^C3^D3 is read from the FIFO queue based on the location of the read pointer, and the read pointer is subsequently advanced to a next buffer line of the queue. At the step 460, four data words of the data segment A4 have been written to the queue.

At step 462, the last data word (e.g., the fifth data word) of the data segment A4 is written to the queue based on the location of the write pointer, and the write pointer is subsequently advanced to a next buffer line of the queue. Operations similar to the step 460 are performed to read the remainder of the data words of the parity data A3^B3^C3^D3 from the FIFO queue. These operations include the step 464 of FIG. 4D. After the steps 462 and 464 are performed, the reading stage of the sub-cycle 308 and the writing stage of the sub-cycle 310 are complete. At this point, the read-modify-write stage of the sub-cycle 310 begins. The read-modify-write stage of the sub-cycle 310 includes the steps 466 and 468 of FIG. 4D. At the step 466, a first word of the data segment A4 is read from a buffer line of the FIFO queue based on the location of the read pointer, and the read pointer is subsequently advanced to a next buffer line of the queue. Next, the data word that was read from the queue (i.e., the first word of the data segment A4) is modified based on a first word of the data segment B4 stored on the disk 108. At 468, the modified data word (denoted as A4^B4 in FIG. 4D) is written to a buffer line of the FIFO queue based on the location of the write pointer, and the write pointer is subsequently advanced to a next buffer line of the queue. It is noted that in the RMW operation of steps 466, 468, a data word is read from one portion of the buffer (e.g., as shown at step 466 of FIG. 4D), and a modified data word is written to another portion of the buffer (e.g., as shown at 468 of FIG. 4D). The reading and writing to different areas of the buffer is a result of the data segments A4, B4, C4, and D4 having a number of data words (e.g., five) that is less than a number of buffer lines comprising the queue (e.g., eight).

Figure 4D:
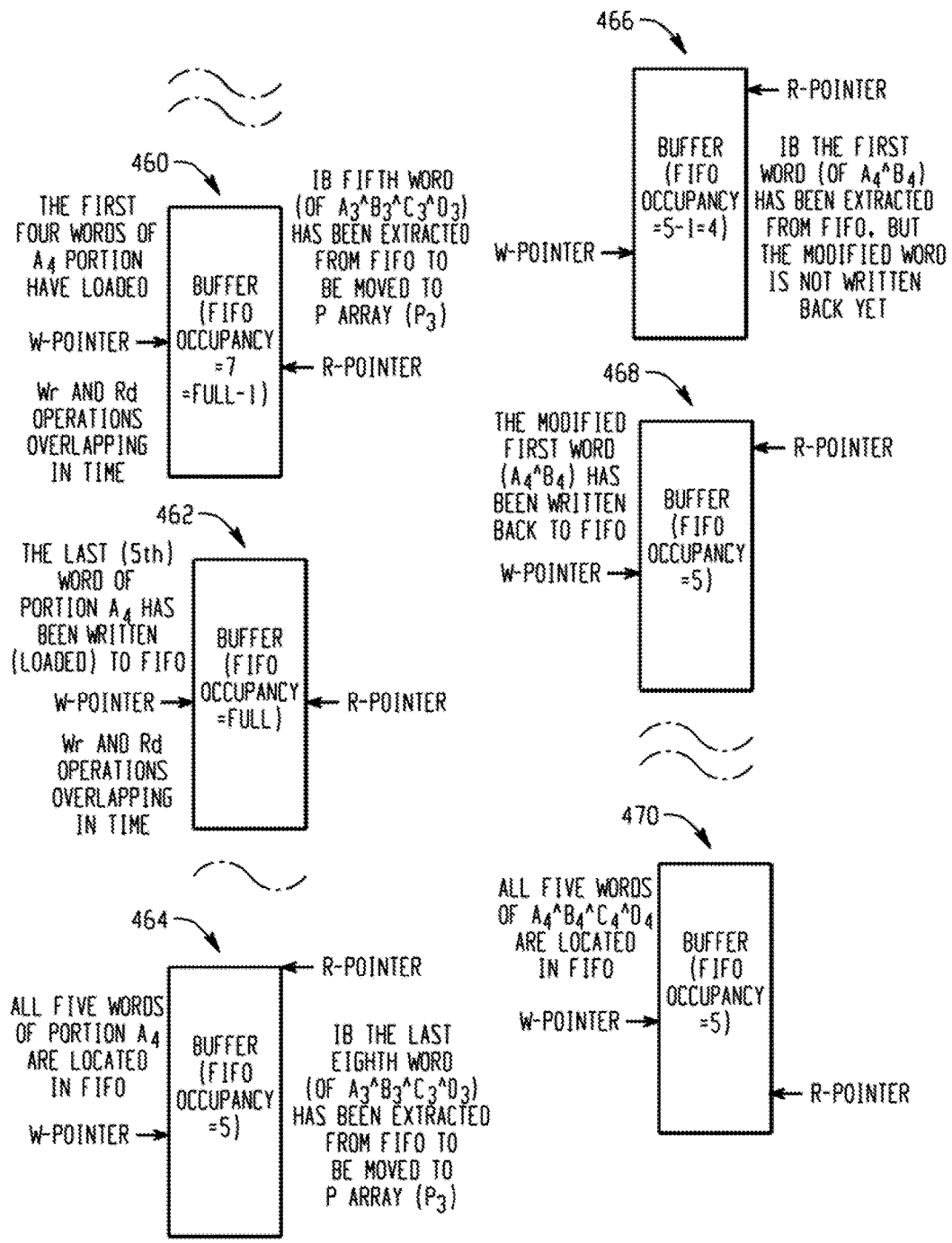

Similar RMW operations are performed to modify the data words A4^B4 based on corresponding data words of the data segment C4 stored on the disk 110. Such operations result in data words A4^B4^C4 being written to buffer lines of the FIFO queue. Then, similar RMW operations are performed to modify the data words A4^B4^C4 based on corresponding data words of the data segment D4 stored on the disk 112. Such operations result in data words A4^B4^C4^D4 being written to buffer lines of the FIFO queue. In this example, the data words A4^B4^C4^D4 comprise parity information for the data segments A4, B4, C4, and D4 stored on the respective disks 106, 108, 110, 112. This parity information is denoted as "P4" in FIG. 3. When all of the data words A4^B4^C4^D4 have been generated and stored in the FIFO queue, the read-modify-write stage of the sub-cycle 310 is complete. The status of the queue at this point is shown in FIG. 4D at 470. After the read-modify-write stage is completed, the subsequent "reading" stage of the sub-cycle 310 begins. As noted above, the approaches of the instant disclosure enable the reading stage of one sub-cycle to be performed concurrently with the writing stage of the next sub-cycle. Thus, in examples, the reading stage of the sub-cycle 310 is performed concurrently with the writing stage of a next sub-cycle. The next sub-cycle is a sub-cycle of a subsequent processing cycle and is not shown in FIG. 3.

In examples, the steps described above with reference to FIGS. 4A-4D are performed by a controller or under the control of a controller (e.g., the controller 128 of FIG. 1A). As noted above, the controller manages the buffer and is configured to perform and/or initiate operations including (i) writing data units from data disks of the RAID device to the buffer, (ii) controlling or performing RMW operations used in generating parity data, (iii) reading parity data stored in the buffer as a result of the RMW operations, and (iv) writing the parity data to a parity disk of the RAID device.

Figure 5:
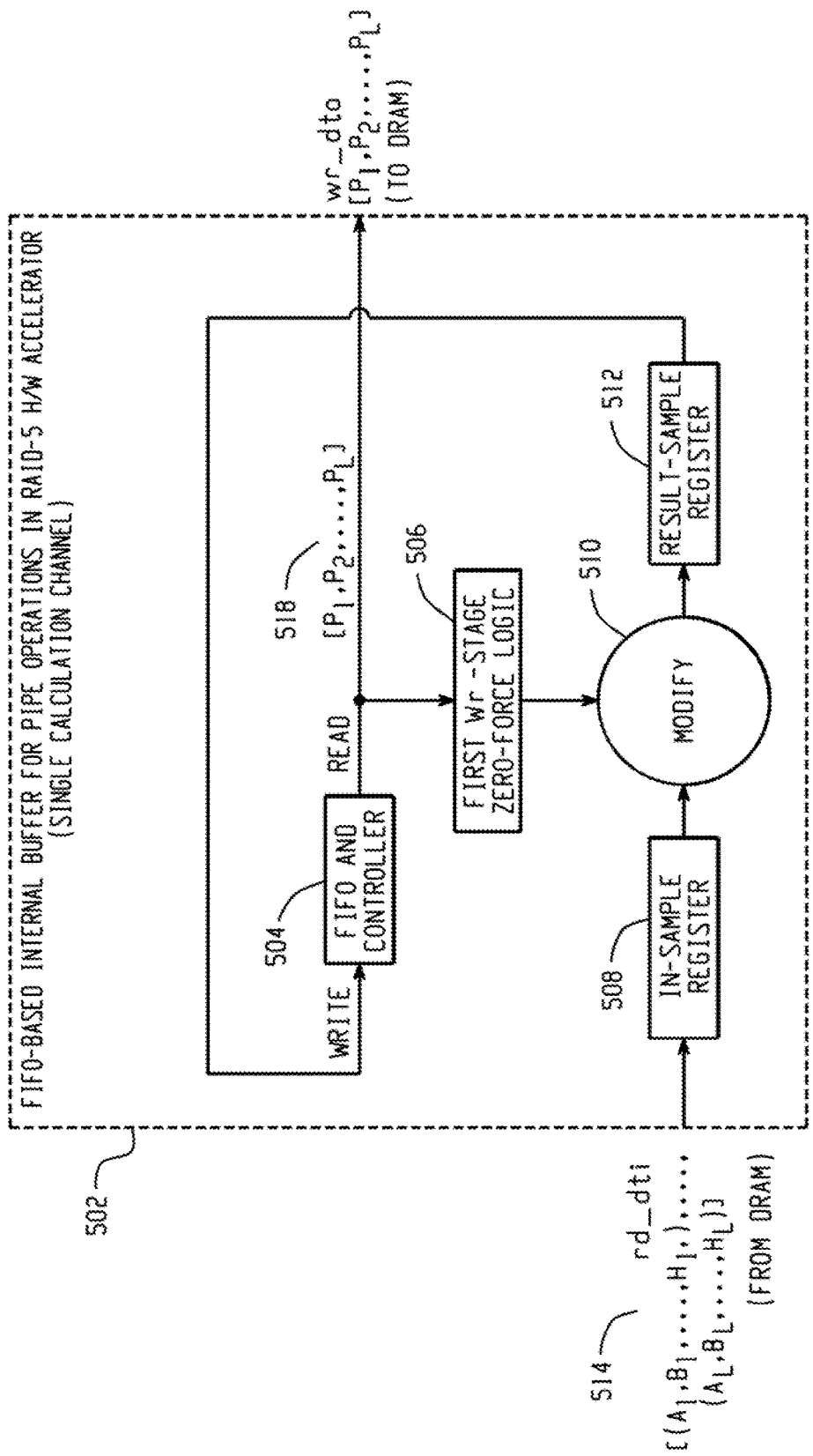
FIG. 5 depicts components of a single-channel RAID hardware accelerator used in calculating parity data, according to an embodiment.

Computer systems employing RAID configurations calculate typically calculate P parity data, Q parity data, or both. FIG. 5 depicts components of a single-channel RAID hardware accelerator 502 used in calculating a single type of parity data (e.g., either of P parity data or Q parity data) during a given period of time, according to an embodiment. The example hardware accelerator 502 of FIG. 5 utilizes a combined FIFO and controller 504. The combined FIFO and controller 504 includes a controller for performing or controlling operations described above (e.g., writing data units from data disks of the RAID device to the buffer, controlling or performing RMW operations used in generating parity data, reading parity data stored in the buffer as a result of the RMW operations, and writing the parity data to a parity disk of the RAID device, among others). The combined FIFO and controller 504 further includes a buffer having a FIFO queue formed therein, as described throughout this disclosure. In examples, the buffer comprises a memory (e.g., a dual-port memory) having a first latency and multiple registers having a second latency that is less than the first latency. A tail of the FIFO queue is formed in the memory, and data units (e.g., data units from a disk, data units that are modified via an RMW operation, etc.) are pushed to the tail of the queue, in embodiments. A head of the FIFO queue is formed in the registers, and data units are popped from the head of the queue, in embodiments. In embodiments where RMW operations are performed using the buffer, as described herein, the relatively low latency of the registers enables each of the RMW operations to be completed within a single clock cycle. The structure of the buffer including the memory-based tail and register-based head is described in further detail in U.S. Provisional Patent Application No. 62/101,111, which is incorporated herein by reference in its entirety.

In the hardware accelerator 502 of FIG. 5, data units 514 read from data disks of the RAID device are received at an in-sample register 508. When modifying a data unit stored in the buffer, modify logic 510 receives (i) the data unit from the buffer of the combined FIFO and controller 504, and (ii) a data unit from the in-sample register 508. The modify logic 510 performs a mathematical operation or logic operation involving the data units to generate a modified data unit. The modify logic 510 writes the modified data unit to a result-sample register 512. The modified data unit is subsequently (i) read from the result-sample register 512, and (ii) written to the buffer of the combined FIFO and controller 504.

By contrast, during a writing stage of a sub-cycle, as described above (e.g., when RMW operations are not being performed), the modify logic 510 receives (i) "zero" value(s) from zero-force logic 506, and (ii) a data unit from the in-sample register 508. The modify logic 510 performs a mathematical operation or logic operation involving the zero value(s) and the data unit. In embodiments, by providing the modify logic 510 the zero value(s), the result of the mathematical or logic operation is equal to the data unit from the in-sample register 508. The modify logic 510 writes the result of the mathematical or logic operation (e.g., equal to the data unit from the in-sample register 508, in embodiments) to the result-sample register 512. The data unit is subsequently (i) read from the result-sample register 512, and (ii) written to the buffer of the combined FIFO and controller 504.

After the parity data is generated and written to the buffer of the combined FIFO and controller 504, the parity data is read from the buffer and written to a parity disk of the RAID device. This is shown in FIG. 5, which depicts parity data 518 that is read from the buffer and subsequently written to the parity disk of the RAID device.

Figure 6:
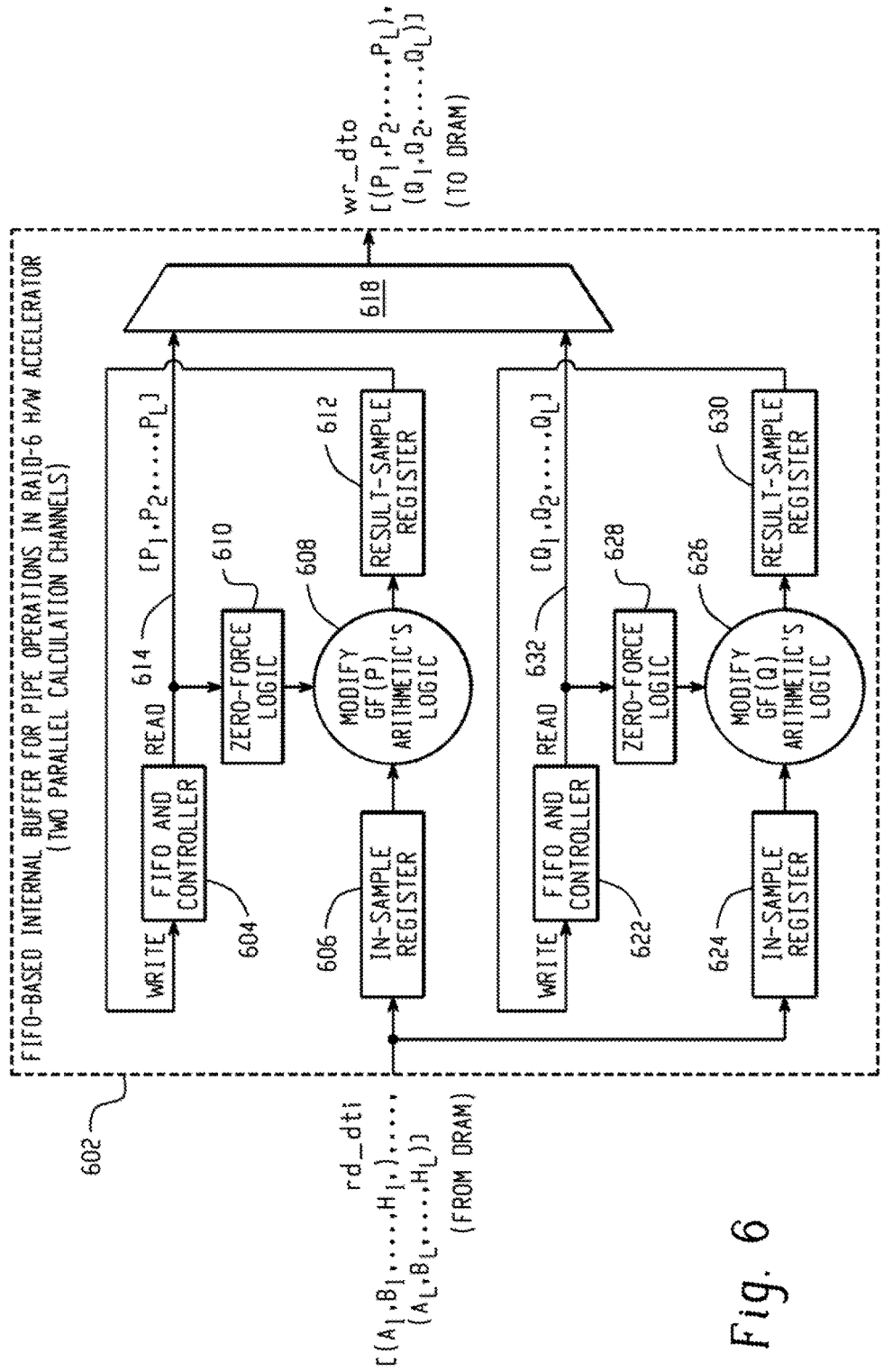
FIG. 6 depicts components of a dual-channel RAID hardware accelerator used in calculating parity data, according to an embodiment.

FIG. 6 depicts components of a dual-channel RAID hardware accelerator 602 used in calculating two types of parity data (e.g., both of P parity data and Q parity data) during a given period of time (e.g., in parallel), according to an embodiment. The RAID hardware accelerator 602 of FIG. 6 includes components that are similar to those of the RAID hardware accelerator 502 of FIG. 5. For brevity, the descriptions of these components are not repeated. For example, the hardware accelerator 602 includes combined FIFO/controllers 604, 622 that function in a manner similar to the combined FIFO and controller 504 of FIG. 5. Likewise, zero force logic 610, 628 of FIG. 6 are similar to the zero force logic 506 of FIG. 5; in-sample registers 606, 624 are similar to the in-sample register 508 of FIG. 5; modify logic 608, 626 are similar to the modify logic 510 of FIG. 5; and result-sample registers 612, 630 are similar to the result-sample register 512 of FIG. 5.

The hardware accelerator 602 of FIG. 6 utilizes two parallel calculation channels to calculate P parity data 614 and Q parity data 632. Each of the different types of parity data is calculated according to the approaches of the instant disclosure, which utilize FIFO-based operations in a buffer to calculate parity data in a relatively small amount of time. The P parity data 614 and the Q parity data 632 are received at a multiplexer 618. The multiplexer 618 selects the P parity data 614 or the Q parity data 632 (e.g., based on a control signal that is received at the multiplexer 618), and the selected parity data is written to a parity disk of the RAID device.

Figure 7:
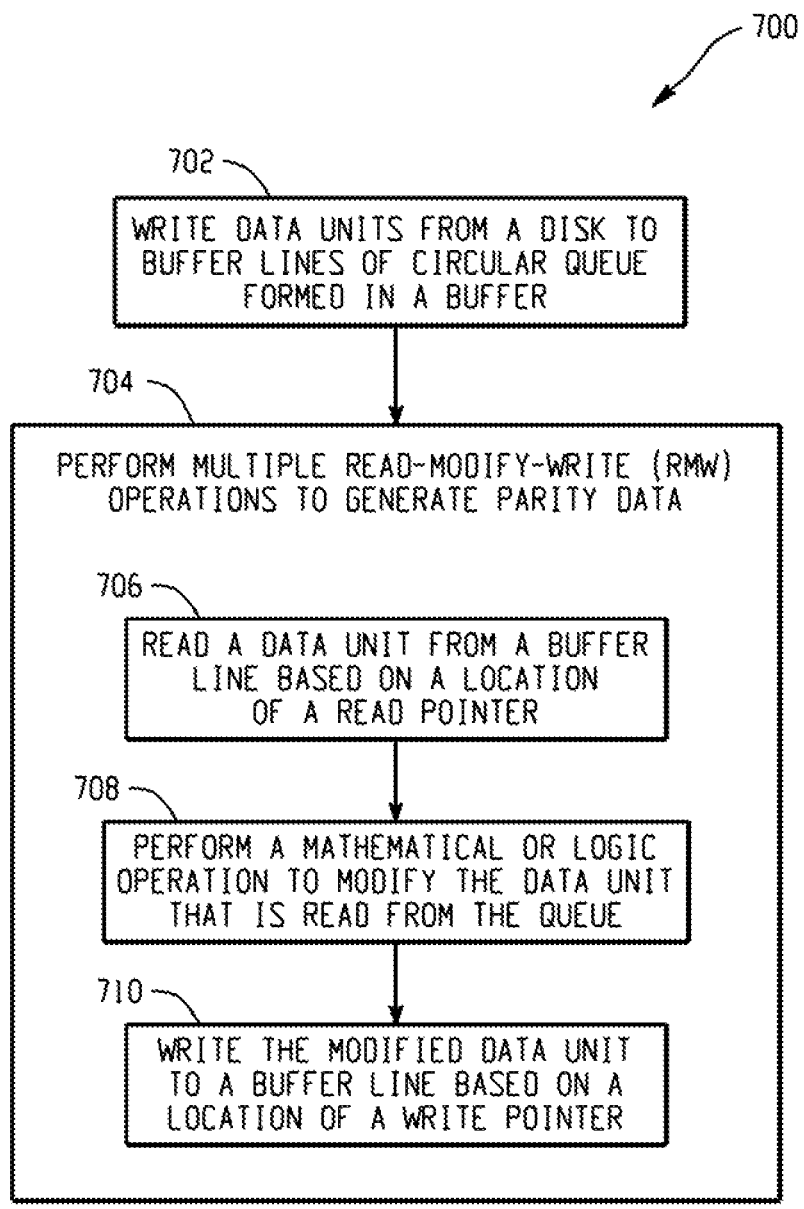
FIG. 7 is a flowchart depicting steps of an example method for generating parity data for a RAID device, according to an embodiment.

FIG. 7 is a flowchart 700 depicting steps of an example method for generating parity data for a RAID device, the RAID device storing data across a plurality of disks, according to an embodiment. At 702, data units are written from a disk of the plurality of disks to buffer lines of a FIFO queue formed in a buffer. The FIFO queue comprises a plurality of buffer lines for queuing data units during the generation of the parity data. At 704, multiple read-modify-write (RMW) operations are performed to generate the parity data. Each RMW operation includes, at 706, popping a data unit from a buffer line of the queue based on a location of a read pointer, and at 708, performing a mathematical or logic operation to modify the data unit that is popped from the queue. Each RMW operation further includes, at 710, pushing the modified data unit into the queue. The modified data unit is pushed to a buffer line of the queue based on a location of a write pointer.

This application uses examples to illustrate the invention. The patentable scope of the invention may include other examples.

What is claimed is:

1. An apparatus for modifying data stored on a disk, the apparatus comprising:
   a buffer including a First-In-First-Out (FIFO) queue, the FIFO queue including a plurality of buffer lines for queuing data units in a predetermined order, wherein the buffer comprises a memory having a first latency, and multiple registers having a second latency that is less than the first latency; and
   a controller configured to
      write data units from the disk to respective buffer lines of the FIFO queue; and
      perform read-modify-write (RMW) operations to modify the data units written to the queue, each RMW operation including (i) popping a data unit from a buffer line of the queue based on a location of a read pointer, (ii) performing a mathematical or logic operation to modify the data unit that is popped from the queue, and (iii) pushing the modified data unit into the queue, the modified data unit being written to a buffer line of the queue based on a location of a write pointer, and the buffer comprising a structure that enables each of the RMW operations to be completed within a single clock cycle, wherein a head of the queue is formed in the multiple registers of the buffer, data units are popped from the head of the queue and the multiple registers are configured to have a sufficient low latency enabling completion of RMW operations within the single clock cycle.

2. The apparatus of claim 1, wherein in the writing of the data units from the disk to the lines of the FIFO queue, the controller writes each data unit to a respective buffer line based on the location of the write pointer.

3. The apparatus of claim 1, wherein the controller is further configured to
advance the write pointer to a next buffer line of the FIFO queue after writing a data unit to the queue; and
advance the read pointer to a next buffer line of the FIFO queue after popping a data unit from the queue.

4. The apparatus of claim 1, wherein the controller is further configured to
read modified data units from respective buffer lines of the queue, each data unit being read from a respective buffer line based on the location of the read pointer; and
write the modified data units to the disk or another disk.

5. The apparatus of claim 1, wherein the disk stores data in data units having a particular size, the buffer having a fixed width that is equal to the particular size.

6. An apparatus for generating parity data for a Redundant Array of Independent Disks (RAID) device, the RAID device storing data across a plurality of disks, the apparatus comprising:
a buffer including a FIFO queue, the FIFO queue including a plurality of buffer lines for queuing data units during the generation of the parity data; and
a controller configured to
write data units from a disk of the plurality of disks to lines of the FIFO queue, each data unit being written to a respective buffer line based on a location of a write pointer, and
perform multiple read-modify-write (RMW) operations to generate the parity data, each RMW operation including (i) popping a data unit from a buffer line of the queue based on a location of a read pointer, (ii) performing a mathematical or logic operation to modify the data unit that is popped from the queue, and (iii) pushing the modified data unit into the queue, the modified data unit being pushed to a buffer line of the queue based on a location of the write pointer, and the buffer comprising a structure that enables each of the RMW operations to be completed within a single clock cycle,
wherein the buffer comprises:
a memory having a first latency, wherein a tail of the queue is formed in the memory and the modified data units are pushed to the tail, and
multiple registers having a second latency that is less than the first latency, wherein a head of the queue is formed in the multiple registers, data units are popped from the head of the queue, and the multiple registers are configured to have a sufficient low latency enabling completion of RMW operations within the single clock cycle.

7. The apparatus of claim 6, wherein the controller is configured to
advance the write pointer to a next buffer line of the FIFO queue after writing a data unit to the queue; and
advance the read pointer to a next buffer line of the FIFO queue after popping a data unit from the queue.

8. The apparatus of claim 6, wherein in the performing of the mathematical or logic operation, the controller is configured to modify the data unit that is popped from the queue based on a value of a corresponding data unit stored on the plurality of disks.

9. The apparatus of claim 6, wherein the controller is further configured to
read the parity data from the buffer, the parity data being stored as data units in respective buffer lines of the queue, each data unit being read from a respective buffer line based on the location of the read pointer; and
write the parity data to a disk of the plurality of disks after the parity data is read from the buffer.

10. The apparatus of claim 9, wherein the data units written from the disk to the FIFO queue comprise data units of a first set of data segments distributed across disks of the plurality of disks, the parity data comprising parity information for the first set of data segments, and wherein the controller is further configured to
concurrent with the reading of the parity data from the buffer, write data units of a second set of data segments from a disk of the plurality of disks to lines of the FIFO queue, the second set of data segments being distributed across disks of the plurality of disks.

11. The apparatus of claim 6, wherein the FIFO queue comprises a circular queue including
a head of the queue comprising a first buffer line of the buffer, and
a tail of the queue comprising a second buffer line of the buffer, the tail of the queue being connected back to the head of the queue via a linking indication such that the read and write pointers wrap around to the head of the queue after being advanced from the tail.

12. The apparatus of claim 6, wherein the RAID device stores the data across the plurality of disks in data units having a particular size, the buffer having a fixed width that is equal to the particular size.

13. The apparatus of claim 12, wherein the FIFO queue has a fixed width that is equal to the fixed width of the buffer.

14. A method for generating parity data for a Redundant Array of Independent Disks (RAID) device, the RAID device storing data across a plurality of disks, the method comprising:
writing data units from a disk of the plurality of disks to buffer lines of a FIFO queue formed in a buffer comprising a memory having a first latency and multiple registers having a second latency that is less than the first latency, the FIFO queue comprising a plurality of buffer lines for queuing data units during the generation of the parity data;
performing multiple read-modify-write (RMW) operations to generate the parity data, each RMW operation including
popping a data unit from a buffer line of the queue based on a location of a read pointer, performing a mathematical or logic operation to modify the data unit that is popped from the queue, and pushing the modified data unit into the queue, the modified data unit being pushed to a buffer line of the queue based on a location of a write pointer, wherein a tail of the queue is formed in the memory of the buffer and the modified data units are pushed to the tail, and wherein a head of the queue is formed in the multiple registers of the buffer, data units are popped from the head of the queue, and the multiple registers are configured to have a sufficient low latency enabling completion of RMW operations within a single clock cycle.

15. The method of claim 14, further comprising:

advancing the read pointer to a next buffer line of the FIFO queue after the popping of a data unit from a respective buffer line; and advancing the write pointer to a next buffer line of the FIFO queue after the writing of a data unit to a respective buffer line.

16. The method of claim 14, further comprising:

reading the parity data from the buffer, the parity data being stored as data units in respective buffer lines of the queue, each data unit being read from a respective buffer line based on the location of the read pointer; and writing the parity data to a disk of the plurality of disks after the parity data is read from the buffer.

17. The method of claim 16, wherein the data units written from the disk to the FIFO queue comprise data units of a first set of data segments distributed across disks of the plurality of disks, the parity data comprising parity information for the first set of data segments, the method further comprising:

concurrent with the reading of the parity data from the buffer, writing data units of a second set of data segments from a disk of the plurality of disks to lines of the FIFO queue, the second set of data segments being distributed across disks of the plurality of disks.

18. The method of claim 14, wherein in the performing of the mathematical or logic operation, the data unit that is popped from the queue is modified based on a value of a corresponding data unit stored on the plurality of disks.

* * * * *